United States Patent
Studerus et al.

(10) Patent No.: US 12,230,088 B2
(45) Date of Patent: Feb. 18, 2025

(54) ACCESS CONTROL METHOD, DEVICE AND SYSTEM

(71) Applicant: dormakaba Schweiz AG, Rümlang (CH)

(72) Inventors: Paul Studerus, Oberweningen (CH); André Lüscher, Feldmeilen (CH); Patrik Eigenmann, Fischbach-Göslikon (CH)

(73) Assignee: dormakaba Schweiz AG, Rümlang (CH)

( * ) Notice: Subject to any disclaimer, the term of this patent is extended or adjusted under 35 U.S.C. 154(b) by 69 days.

(21) Appl. No.: 18/256,029

(22) PCT Filed: Dec. 7, 2021

(86) PCT No.: PCT/EP2021/084581
§ 371 (c)(1),
(2) Date: Jun. 5, 2023

(87) PCT Pub. No.: WO2022/122728
PCT Pub. Date: Jun. 16, 2022

(65) Prior Publication Data
US 2024/0038011 A1    Feb. 1, 2024

(30) Foreign Application Priority Data
Dec. 8, 2020 (CH) .................................. 01557/20

(51) Int. Cl.
*G07C 9/28* (2020.01)
*G07C 9/10* (2020.01)
*G08B 21/04* (2006.01)

(52) U.S. Cl.
CPC .................. *G07C 9/28* (2020.01); *G07C 9/10* (2020.01); *G08B 21/0461* (2013.01)

(58) Field of Classification Search
CPC ........ G07C 9/28; G07C 9/10; G07C 2209/63; G07C 9/00309; G08B 21/0461; H04W 4/021; H04W 4/80
See application file for complete search history.

(56) References Cited

U.S. PATENT DOCUMENTS

2017/0148243 A1*   5/2017   Shin .................. G07C 9/00309
2020/0314651 A1   10/2020   Pirch et al.
(Continued)

FOREIGN PATENT DOCUMENTS

EP    3355281 A1    8/2018
EP    3731533 A1    10/2020

OTHER PUBLICATIONS

International Search Report and Written Opinion of the International Searching Authority for International Application No. PCT/EP2021/084518, mailed on Apr. 7, 2022, in 17 pages.
(Continued)

*Primary Examiner* — An T Nguyen
(74) *Attorney, Agent, or Firm* — Knobbe, Martens, Olson & Bear, LLP

(57) ABSTRACT

A method for controlling access within a secure control area using an access control device communicatively connected to one or more barrier(s) arranged within the secure control area, the method comprising: executing ultra-wideband transmissions with authentication device(s) using one or more ultra-wideband transceiver(s) of the access control device; detecting, by a processing unit of the access control device, entry and/or exit of the authentication device(s) (100) through the barrier(s) by processing signal properties of the one or more ultra-wideband transmissions and operating the barrier(s)—by the access control device—in a first mode of operation; switching operation of the barrier(s) by the access control device—from the first mode of operation (Continued)

into a second mode of operation upon determining a last exit of any authentication device from the secure control area.

16 Claims, 9 Drawing Sheets

(56) References Cited

U.S. PATENT DOCUMENTS

| | | | | |
|---|---|---|---|---|
| 2023/0184916 A1* | 6/2023 | Pirch | ................. | H04B 17/3912 |
| | | | | 342/22 |
| 2023/0186704 A1* | 6/2023 | Pirch | ................. | G07C 9/00309 |
| | | | | 340/5.7 |

OTHER PUBLICATIONS

Search Report for Swiss Patent Application No. CH 15572020, mailed on Apr. 8, 2021, in 5 pages.

* cited by examiner

ACCESS CONTROL METHOD, DEVICE AND SYSTEM

CROSS-REFERENCE TO RELATED APPLICATIONS

This application is the U.S. National Phase under 35 U.S.C. § 371 of International Application PCT/EP2021/084581, filed Dec. 7, 2021, which claims priority to CH Application No. 01557/20, filed Dec. 8, 2020, the entire contents of each of which are incorporated by reference herein and made a part of this specification.

FIELD OF THE INVENTION

The present invention relates to a method, an access control device and an access control system for controlling access within a secure control area using one or more barrier(s) arranged within the secure control area. Furthermore, the present invention relates to a computer program product comprising computer-executable instructions which, when executed by a processing unit of an access control device, causes the access control device to carry out the method for controlling access.

BACKGROUND OF THE INVENTION

Keyless entry systems have become widely used in applications in particular for access control in building facilities. Access control relates to granting, denying or limiting access to a secure controlled area, usually by means of some level of access control by use of a barrier, such as a door, turnstile, parking gate, elevator door, or other barrier.

Keyless entry systems operate in that an access control device executes a wireless communication with an authentication device, such as a keyless fob, a keycard or an authentication device incorporating a corresponding wireless transceiver. Once said wireless communication between the access control device and the authentication device has been executed, the access control device exchanges data messages with the authentication device. The authentication can be initiated either by a user, for instance by pressing a button on the authentication device to trigger transmission of authentication data to the access control device, or from the access control device itself which periodically transmits request signals and awaits a response message from the authentication device comprising authentication data. Upon successful authentication, i.e. verification of user credentials (e.g. by correlating authentication data received from the authentication device with a list of authorized users), the access control device grants access to the user in possession of the respective authentication device, e.g. by opening said barrier. On the other hand, if the authentication fails, the access control device denies access to the user in possession of the respective authentication device, e.g. by locking the barrier/by keeping the barrier locked.

For close-range applications, a radio-frequency identification (RFID) transponder (or tag) is often used, which has mostly replaced earlier magnetic stripe cards. Other current solutions use infra-red systems or radio systems to transmit an authenticating signal from an authentication device to an access control device of a security control system. Close-proximity keyless systems, (i.e. between direct contact and a threshold of a few centimeters), for example RFID based systems, allow determination of a user's proximity to a barrier by appropriate placement of a reader device of the access control device. However, as their name implies close-proximity keyless systems suffer from the disadvantage that they require a very close proximity of the authentication device to the access control device. In order to overcome this disadvantage, mid-range keyless entry systems have been proposed, in particular based on ultra-wideband UWB communication. Ultra-wideband UWB systems are advantageous since they allow reliable mid-range communication without a user having to precisely identify the reader device. As the communicating range between an authentication device and an access control device increases, the convenience and ease-of-use increases, because the authentication device does not need to be placed in very close range, such as less than one centimeter from the access control device. The user no longer needing to precisely locate the access control device (or its antenna) not only adds convenience but also has the potential to speed up the process, thereby increasing the throughput through a barrier.

However, the authentication process required for each entry into secure control areas controlled by an access control system may become inconvenient, in particular in areas of frequent traffic through the barriers of the secure control areas. Furthermore, under certain conditions it may be desirable to allow entry into the secure control area even to persons who do not possess respective authentication devices. Therefore, according to known solutions, access control is de-activated under certain conditions, such as in a certain time window (e.g. working hours). Sometimes, users of such systems are instructed to re-activate access control in certain conditions, such as leaving the secure control area. However, such solutions pose a significant security risk since access control may be de-activated even in the absence of any authorized personnel, while user re-activation of access control is prone to human error.

SUMMARY OF THE INVENTION

It is an object of embodiments disclosed herein to provide a method, an access control device and an access control system for controlling access within a secure control area using one or more barrier(s) arranged within the secure control area which overcome one or more of the disadvantages of the prior art.

In particular, it is an object of embodiments disclosed herein to provide a method, an access control device and an access control system for controlling access within a secure control area using which provides better user convenience; greater flexibility while at the same time maintaining security of the secure control area.

According to embodiments of the present disclosure, the above-mentioned objects are addressed by a method for controlling access within a secure control area using an access control device communicatively connected to one or more barrier(s) arranged within the secure control area. According to the method of the present invention, ultra-wideband transmissions are executed with authentication device(s) using one or more ultra-wideband transceiver(s) of the access control device. By processing signal properties of the one or more ultra-wideband transmissions, a processing unit of the access control device detects entry and/or exit of authentication device(s) through the barrier(s).

Upon determining a last exit of any authentication device from the secure control area, the operation of the barrier(s) by the access control device is switched from a first mode of operation into a second mode of operation.

For increased convenience and/or flexibility, in the first mode of operation, the access control device operates the barrier(s) such as to allow entry or exit irrespective of an authentication of authentication device(s).

For maintaining security of the secure control area, in the second mode of operation, the access control device operates the barrier(s) such as to allow or deny entry of an authentication device(s) into the secure control area in accordance with an access control process of the authentication device(s).

Operating the barrier(s)—by the access control device—in the first mode of operation (increased convenience and/or flexibility) is triggered either upon determining a first entry of an authentication device(s) into the secure control area and/or at the beginning of a first time window (such as the beginning of regular business hours of the secure control area).

In an embodiment, entry and exit of authentication device(s) through the barrier(s) is determined by analyzing a physical location and/or direction of movement of authentication device(s) by processing signal properties of the one or more ultra-wideband transmissions between the one or more ultra-wideband transceiver(s) of the access control device and an ultra-wideband communication module of the authentication device.

In a further embodiment of the present disclosure, in order to determine entry and exit of authentication device(s) through the barrier(s), a physical location(s) of the authentication device(s) with respect to the barrier is determined by multilateration and/or multiangulation using the plurality of ultra-wideband transmissions.

In an even further embodiment of the present disclosure, in order to distinguish between an entry and exit of authentication device(s) through the barrier(s), a direction of movement of the authentication device(s) with respect to the barrier is determined by a sequence of two or more multilateration and/or multiangulation using the plurality of ultra-wideband transmissions.

According to embodiments of the present disclosure the one or more ultra-wideband transceiver(s) of the access control device are arranged such as to allow distinguishing between an entry and exit of authentication device(s) through the barrier(s). In an embodiment, at least one ultra-wideband transceiver(s) is arranged at an entry side of the respective barrier(s) and at least one ultra-wideband transceiver(s) is arranged at an exit side of the respective barrier(s).

According to embodiments of the present disclosure, processing of the signal properties comprises processing one or more of: a propagation time, an amplitude variation, or a phase difference of signals of the one or more ultra-wideband transmission(s).

Determining the physical location and/or direction of movement of authentication device(s) by processing signal properties of ultra-wideband UWB transmissions is particularly advantageous since it allows a reliable and precise determination of the distance(s).

s Determining the physical location and/or direction of movement of authentication device(s) based on the propagation time of an ultra-wideband transmission comprises measuring the time required for a signal to travel from the ultra-wideband transceiver to the ultra-wideband communication module of the authentication device and/or the time required for a signal to travel from the authentication device to the ultra-wideband transceiver. In a particular embodiment, a time difference is used as a basis for determining the distance, as it is more secure against spoofing attacks, wherein a third party may use a radio relay device to gain unauthorized access to a location or system in a so-called "relay-attack". Depending on the embodiment, the time difference is a "one-way time-of-flight" time difference between the ultra-wideband transceiver sending the request value and the is authentication device receiving the request value, or a "round-trip time-of-flight" time difference, in which a second transmission takes place from the authentication device to the ultra-wideband transceiver either prior to, or after the first transmission of the request value. In the "one-way time-of-flight" scenario, the ultra-wide-band transceiver and the authentication device need to be provided with tightly synchronized clocks for accurately determining the distance. In the latter case of a "round-trip time-of-flight" calculation, there is stored, either in the authentication device or the ultra-wideband transceiver, an accurate representation of the processing time, i.e. the time it takes between the reception of an ultra-wideband transmission and the sending of a response ultra-wideband transmission, which processing time allows for accurately determining the distance. Measurement of a time required for the signal to travel from the ultra-wideband transceiver to the authentication device and back "round-trip time-of-flight" is advantageous as it does not require the precise synchronization of clock signals of the ultra-wideband transceiver and the authentication device.

Determining the physical location and/or direction of movement of authentication device(s) based on amplitude difference, comprises determining the difference in signal amplitude between the signal transmitted by the ultra-wideband transceiver and the signal received by the authentication device (or vice-versa). By taking into consideration the attenuation of the signal, the distance between the ultra-wideband transceiver and the authentication device is calculated.

Determining the physical location and/or direction of movement of authentication device(s) based on phase difference comprises detecting the difference in signal phase between the signal transmitted by the ultra-wideband transceiver and the signal received by the authentication device. By taking into consideration the change in signal phase, the distance between the ultra-wideband transceiver and the authentication device is determined. It is to be understood that for the amplitude difference and phase difference, alternatively, the signal may also be transmitted by the authentication device and received by the ultra-wideband transceiver.

In a first step of an access control process(s), executed by the access control device in the second mode of operation, authentication data is received from the authentication device. Having received the authentication data, the authentication data is verified in order to determine whether the authentication device is authorized access into the secure control area. Such verification of the authentication data may be performed either by a comparison with authentication data stored in a data store (comprised by or communicatively connected to the access control device) and/or by verifying using a corresponding algorithm.

If, based on verifying the authentication data, it has been determined that the authentication device is authorized, the access control device operates the barrier(s) in whose proximity the authentication device is located such as to allowing entry.

On the other hand, if, based on verifying the authentication data, it has been determined that the authentication device not authorized, the access control device operates the barrier(s) to deny entry.

In order to prevent authentication devices which have been forgotten (left behind) in the secure control area to negatively affect security (by wrongly assuming the presence of authorized personnel), stationary authentication device(s) are disregarded when determining a last exit of an authentication device from the secure control area. Stationary authentication device(s) are identified in that further ultra-wideband transmissions are executed—at (periodic) intervals—with authentication device(s) using the ultra-wideband transceiver(s) of the access control device and authentication device(s) which are stationary for an extended period of time, are identified by processing signal properties of the one or more ultra-wideband transmissions.

In order to allow particular persons (such as administrators, security personnel, etc.) entry and exit to and out of the secure control area without triggering the first or the second mode of operation, according to embodiments of the present disclosure, authentication device(s) of a first authorization type are disregarded when determining exit of a last authentication device from the secure control area. Such particular persons (e.g. administrators, security personnel, etc.) possessing authentication device(s) of a first authorization type are identified by distinguishing, based on authentication data of the authentication device(s), between a first-type and a second-type authorization of authentication device(s).

In order to increase security, in particular outside a certain time window, such as regular business hours of the secure control area, according to embodiments of the present disclosure, operating the barrier(s)—by the access control device—in the first mode of operation is restricted to a first time window (e.g. 8:00 to 18:00). Outside this first time window, the access control device switches operation into the second mode of operation—irrespective whether a last exit has been determined or not. Furthermore, in the absence of determining a last exit from the secure control area upon lapse of the first time window, an alarm signal is generated by the access control device. The alarm signal comprises: an audible, visual or tactile signal emitted by the access control device or a device communicatively connected thereto and/or a data signal comprising data indicative of said alarm. Optionally, data identifying each authentication device(s) with respect to which an entry into the secure control area has been detected by the barrier(s) but no exit out of the secure control area has been detected by any of the barrier(s) is included, into the alarm signal.

Besides providing better user convenience; greater flexibility while at the same time maintaining security of the secure control area, it is a further objective of embodiments of the present invention to facilitate safe evacuation from the secure control area. Hence, in order to facilitate safe evacuation from the secure control area, the access control device operates the barrier(s) in a third mode of operation upon receipt of an evacuation signal. Operating the barrier(s) in the third mode of operation comprises: allowing entry and exit through the barrier(s) irrespective of an authentication of authentication devices; and generating an alarm signal—by the access control device—in the absence of determining a last exit from the secure control area after expiry of an evacuation timeout. The alarm signal comprises: an audible, visual or tactile signal emitted by the access control device or a device communicatively connected thereto and/or a data signal comprising data indicative of said alarm. Optionally, data identifying each authentication device(s) with respect to which an entry into the secure control area has been detected by the barrier(s) but no exit out of the secure control area has been detected by any of the barrier(s) is included, into the alarm signal.

According to embodiments of the present disclosure, the physical location(s) of the authentication device(s) within the secure control area is determined by multilateration and/or multiangulation using the plurality of ultra-wideband transmissions. In particular, the physical location(s) of the authentication device(s) within the secure control area is determined at (periodic) intervals so that data indicative of the physical location(s) of each authentication device(s) with respect to which an entry into the secure control area (A) is has been detected by the barrier(s) (5, 5.1, 5.2, 5.3, 5.4) but no exit out of the secure control area (A) has been detected by any of the barrier(s) (5, 5.1, 5.2, 5.3, 5.4) can be included into the above-mentioned alarm signal(s).

In order to be able to identify the so-called first entry and last exit into, respectively out of the secure control area, an entry corresponding to authentication device(s) is recorded into a presence list associated with the secure control area upon the processing unit's detection of entry of the authentication device(s) through any one of the barrier(s). Entry(s) corresponding to authentication device(s) are removed from the presence list associated with the secure control area upon the processing unit's detection of exit of the authentication device(s) through any one of the barrier(s). Based on the presence list, a last exit of an authentication device is determined upon removing the last entry from the presence list, while a first entry of an authentication device is determined upon recording the first entry into the presence list. According to embodiments of the present disclosure, the presence list is maintained in a data store comprised by or commutatively connected to the access control device.

According to embodiments of the present disclosure, the above-mentioned objects are further addressed by an access control device for controlling access within a secure control area using one or more barrier(s) arranged within the secure control area, the access control device comprising a processing unit and one or more ultra-wideband transceiver(s), wherein the access control device is configured to carry out the method according to one of the embodiments disclosed herein.

According to embodiments of the present disclosure, the above-mentioned objects are further addressed by an access control system for controlling access within a secure control area comprising: one or more barrier(s) arranged within the secure control area; one or more communicatively connected access control device(s) according to embodiments disclosed herein, the access control device(s) being communicatively connected to the one or more barrier(s).

According to embodiments of the present disclosure, the above-mentioned objects are further addressed by a computer program product comprising computer-executable instructions which, when executed by a processing unit of an access control device, causes the access control device to carry out the method for controlling access within a secure control area according to one of the embodiments disclosed herein.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the disclosure described in the appended claims. The drawings in which:

DETAILED DESCRIPTION OF EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
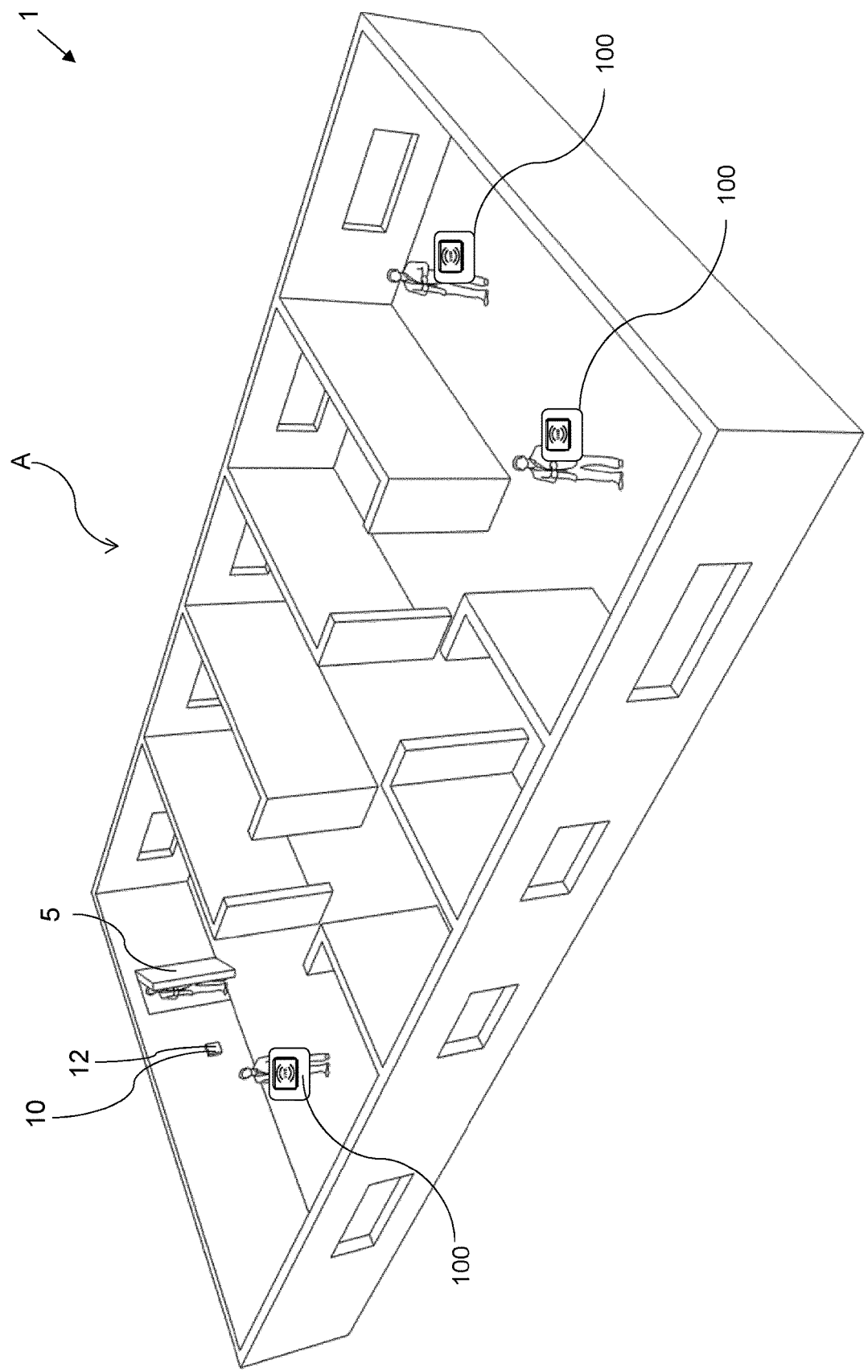
FIG. 1: shows a highly schematic perspective view of an access control system according to the present invention—as deployed in a secure control area.

FIG. 1 shows a highly schematic perspective view of an access control system 1 according to the present invention—as deployed in a secure control area A. The security control system 1 comprises an access control device 10 and a barrier 5 arranged within a secure control area A, the barrier 5 being communicatively connected to the access control is device 10. The barrier 5 may be such as a door, turnstile, parking gate, elevator door, or other barrier.

The secure control area A may be an entrance area of a building, a hallway, a meeting room or the like. According to embodiments of the present disclosure, the access control device may be located remote from the barrier 5.

In the figures, reference numeral 100 refers to an authentication device. The authentication device 100 is a portable electronic system such as a such as a keyless fob, car key, a keycard or an authentication device incorporated into a smart phone, smart watch, tablet, laptop, or similar device. The authentication device 100 contains a processor (not shown) and an ultra-wideband communication module 102. The ultra-wideband communication module 102 is configured for establishing an ultra-wideband transmission with an access control device 10 of the security control system 1. According to further embodiments disclosed herein, the authentication device 100 further comprises a wireless communication module for data transmission to a respective interface of the communication module 16 of the access control device 10 using an alternative communication technology (as compared to UWB) such as Bluetooth Low Energy (BLE), a Wireless Local Area Network (WLAN), Zig Bee, Radio Frequency Identification (RFID), Z-Wave, and/or Near Field Communication (NFC). According to further embodiments disclosed herein, the authentication device 100 also contains provisions for wired communication via a socket such as USB, Micro-USB, USB-C, Lightning, or 3.5 mm jack, for use in a wired communication using an appropriate protocol for wired transmission.

Figure 2:
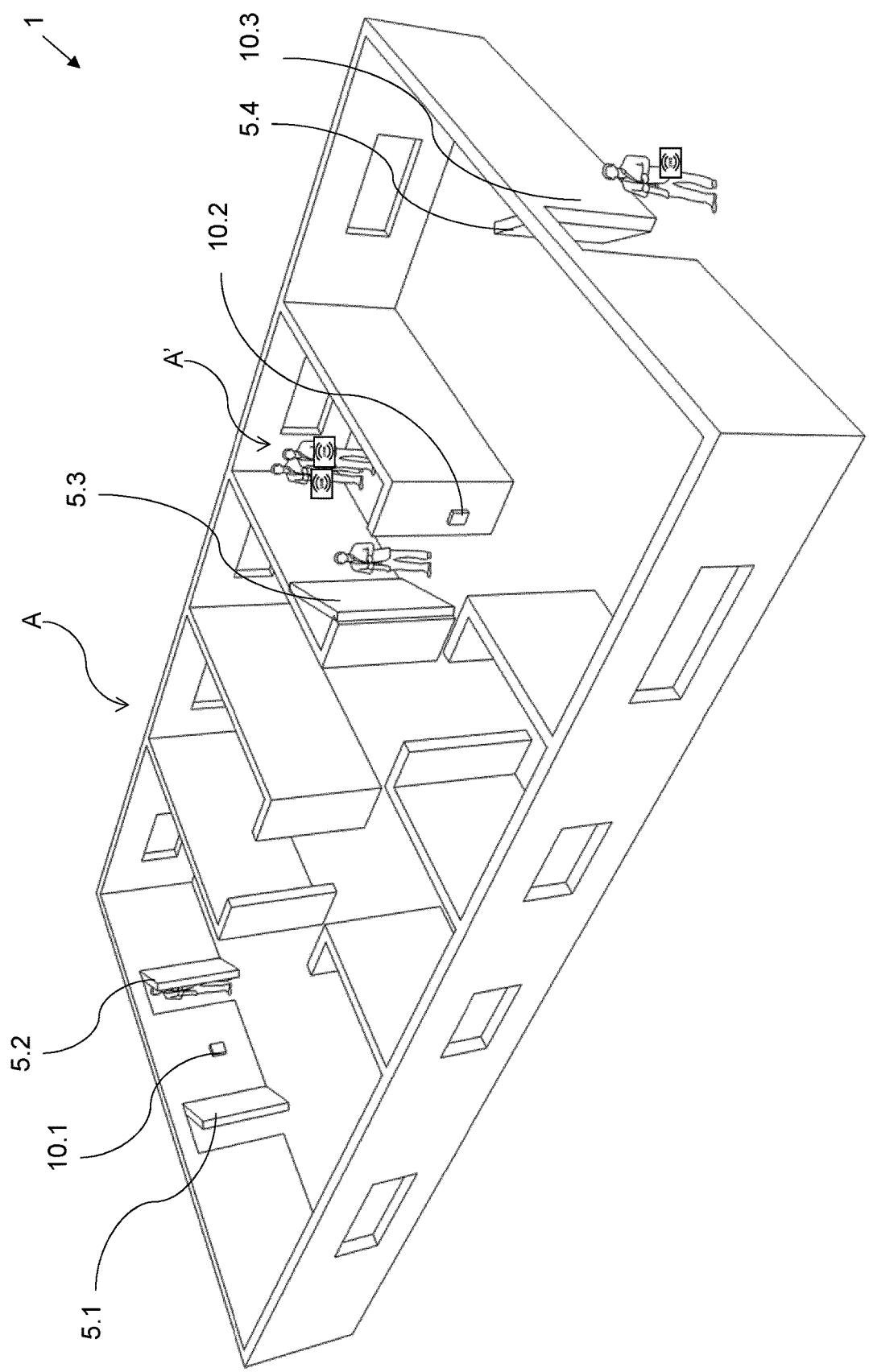
FIG. 2: shows a highly schematic perspective view of an access control system according to the present invention—as deployed in a secure control area comprising a meeting room as a further secured control area.

FIG. 2 shows a highly schematic perspective view of an access control system 1 according to the present invention—as deployed in a secure control area A comprising a meeting room as a further secured control area A'. The access control of the meeting room/further secure control area A' is performed according to any of the embodiments of the method for controlling access according to the present invention, particular parameters being defined individually, such as the time window for defining the periods/limits for operating the corresponding barrier 5.3 in the first or second mode of operation. Furthermore, the authorization (determined based on the authentication data from the authentication device 100) may also be specific for the further secure control area A', in particular authentication devices 100 authorized access to the further secure control area A' represent a subset of the authentication devices 100 authorized access to the secure control area A. Also, the presence list used to track authentication devices entering and exiting, is specific to the further secure control area A'. Correspondingly the first entry and last exit are also specific to the further secure control area A'.

It shall be recognized that an entire hierarchy of distinct and/or overlapping secure control areas A can be operated according to embodiments of the present invention.

Figure 3:
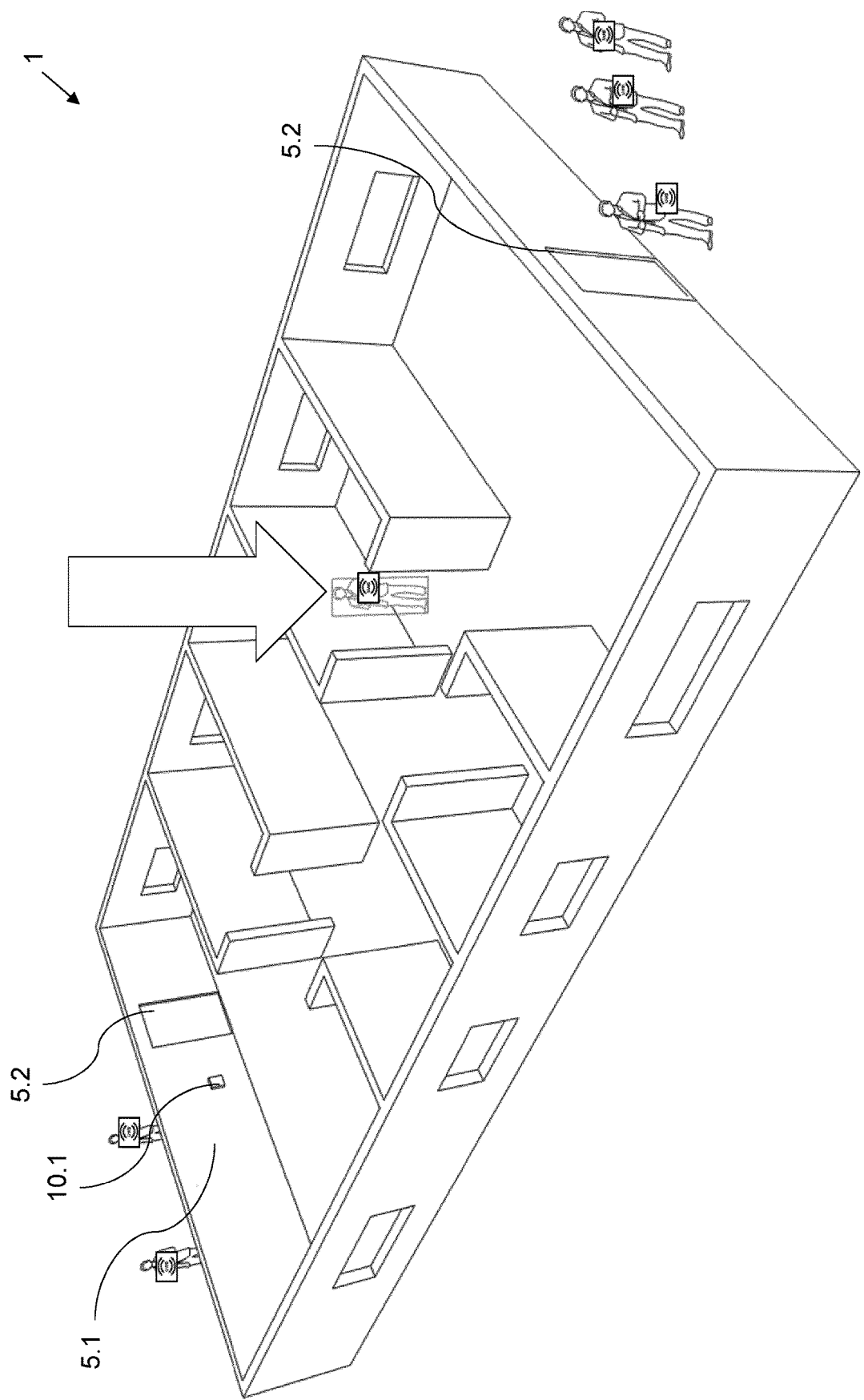
FIG. 3: shows a highly schematic perspective view of an access control system according to the present invention—as deployed in a secure control area illustrating an evacuation scenario.

FIG. 3 shows a highly schematic perspective view of an access control system 1 according to the present invention—as deployed in a secure control area A, illustrating an evacuation scenario, wherein an alert signal is generated comprising an indication of the location of an authentication device 100 with respect to which an entry into the secure control area (A) has been detected by the barrier(s) (5, 5.1, 5.2, 5.3, 5.4) but no exit out of the secure control area (A) has been detected by any of the barrier(s) (5, 5.1, 5.2, 5.3, (illustrated with a block arrow).

Figure 4:
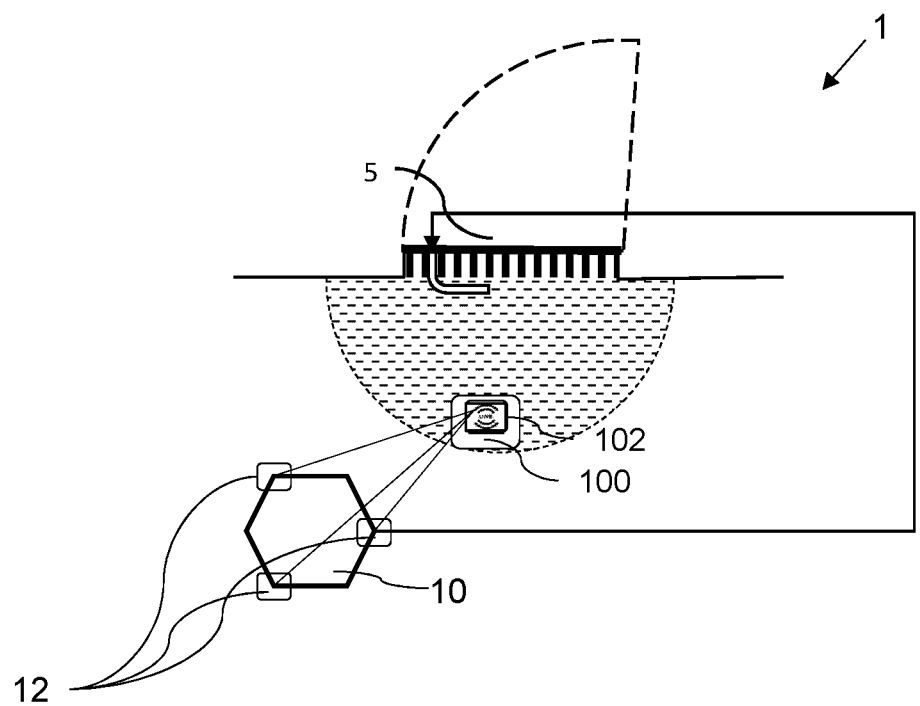
FIG. 4: shows a highly schematic top view of an access control device, illustrating an authentication device being identified at an entry side of a barrier.

FIG. 4 shows a highly schematic top view of an access control device, illustrating an authentication device 100 being identified at an entry side of a barrier 5. The ultra-wideband transceivers 12 are configured to execute ultra-wideband transmissions with authentication device(s) 100. The processing unit 14 is configured to determine entry and exit movements/passages of authentication device(s) 100 through the barrier(s) 5, 5.1, 5.2, 5.3, 5.4 by analyzing a physical location and/or direction of movement of authentication device(s) 100 by processing signal properties of the one or more ultra-wideband transmissions between the one or more ultra-wideband transceiver(s) 12 of the access control device 10 and an ultra-wideband communication module 102 of the authentication device 100. The physical location(s) and/or direction of movement of the authentication device(s) 100 is determined in particular as 2-dimensional or 3-dimensional location(s) and/or direction of movement, in particular as 2-dimensional or 3-dimensional coordinate(s), within the secure control area A.

The access control device 10 is configured to determine the physical location(s) and/or direction of movement of the authentication device(s) 100 within the secure control area A by multilateration and/or multiangulation using the plurality of ultra-wideband transmissions by the plurality of ultra-wideband transceiver(s) 12 of the access control device 10.

Multilateration and/or multiangulation relies on determining the distances between the authentication device(s) 100 and the plurality of ultra-wideband transceiver(s) 12 of the access control device 10. Determining the distances between the authentication device(s) 100 and the plurality of ultra-wideband transceiver(s) 12 based on the propagation time of the ultra-wideband transmissions comprises measuring the time required for a signal to travel from the ultra-wideband transceivers 12 to the ultra-wideband communication module 102 of the authentication device 100; and/or the time required for a signal to travel from the ultra-wideband communication module 102 of the authentication device 100 to the ultra-wideband transceiver 12. In a particular embodiment, a time difference is used as a basis for determining the distances, as it is more secure against spoofing attacks, wherein a third party may use a radio relay device to gain unauthorized access to a location or system in a so-called "relay-attack". Depending on the embodiment, the time difference is a "one-way time-of-flight" time difference between the ultra-wideband transceivers 12 sending a signal and the authentication device 100 receiving the signal, or a "round-trip time-of-flight" time difference, in which a second transmission takes place from the ultra-wideband communication module 102 of the authentication device 100 to the ultra-wideband transceivers 12 either prior to, or after, the first transmission of the signal. In the "one-way time-of-flight" scenario, the ultra-wide-band transceivers 12 and the ultra-wideband communication module 102 of the authentication device 100 need to be provided with tightly synchronized clocks for accurately determining the distances. In the latter case of a "round-trip time-of-flight" calculation, there is stored, either in the authentication device 100 or the ultra-wideband transceivers 12, an accurate representation of the processing time, i.e. the time it takes between the reception of an ultra-wideband transmission and the sending of a response ultra-wideband transmission, which processing time allows for accurately determining the distances. Measurement of a time required for the signal to travel from the ultra-wideband transceivers 12 to the ultra-wideband communication module 102 of the authentication device 100 and back "round-trip time-of-flight" is advantageous as it does not require the precise synchronization of clock signals of the ultra-wideband transceivers 12 and the authentication device 100.

Determining the distances between the authentication device(s) 100 and the plurality of ultra-wideband transceiver(s) 12 based on amplitude difference, comprises determining the difference in signal amplitude between the signal transmitted by the ultra-wideband transceivers 12 and the signal received by the ultra-wideband communication module 102 of the authentication device 100 (or vice-versa). By taking into consideration the attenuation of the signal, the distances are calculated.

Determining the distances between the authentication device(s) 100 and the plurality of ultra-wideband transceiver(s) 12 based on phase difference comprises detecting the difference in signal phase between the signal transmitted by the ultra-wideband transceivers 12 and the signal received by the ultra-wideband communication module 102 of the authentication device 100. By taking into consideration the change in signal phase, the distances are determined. It is to be understood that for the amplitude difference and phase difference, alternatively, the signal may also be transmitted by the ultra-wideband communication module 102 of the authentication device 100 and received by the ultra-wideband transceivers 12 of the access control device 10.

According to embodiment(s) disclosed herein, determining the distance(s) between the ultra-wideband transceivers 12 and the authentication device 100 comprises transmitting a request message to the ultra-wideband communication module 102 of the authentication device 100 and processing a response message received from the authentication device 100, referred to as control device initiated transmission. Control device transmission is advantageous as the timing respectively the frequency of the interrogation (transmitting a request message to the authentication device) is solely in the control of the access control device 10.

Alternatively, or additionally, determining the first distance between the ultra-wideband transceivers 12 and the authentication device 100 comprises receiving and processing broadcast signal from the authentication device 100, referred to as authentication device initiated transmission. Authentication device initiated transmission is advantageous since it allows the authentication device 100 to control the timing/frequency of the broadcast signal(s) (to establish the first respectively second ultra-wideband transmission), allowing the authentication device 100 to switch its respective radio communication module into a standby/low-power or off mode to thereby conserve energy.

Figure 5:
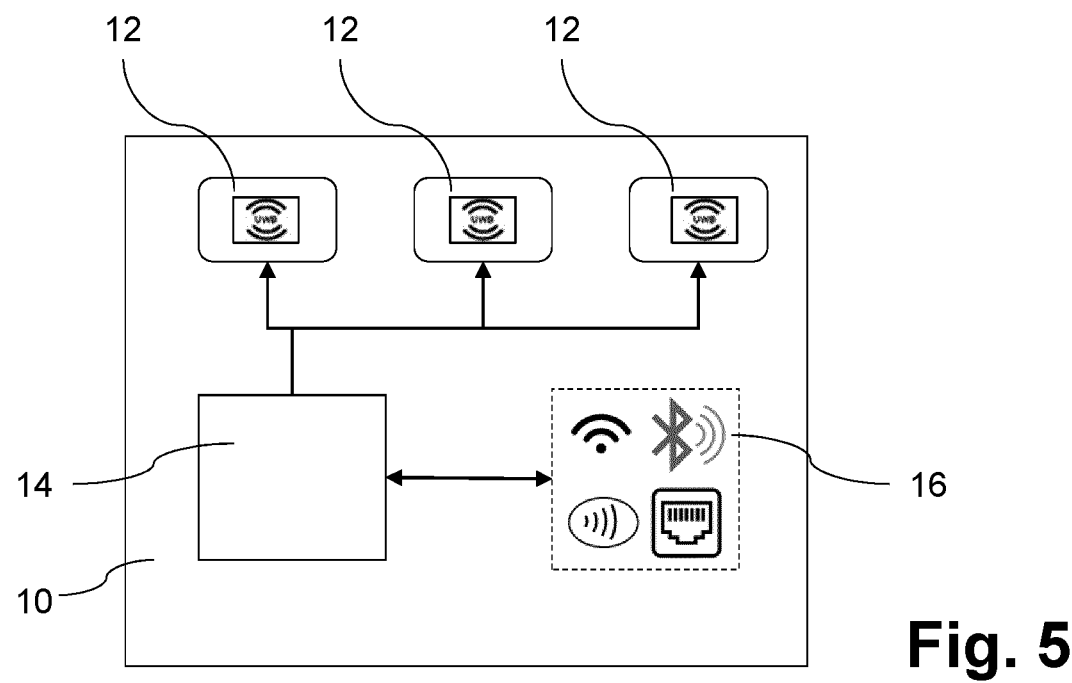
FIG. 5: shows a schematic block diagram of an access control device according to the present invention.

FIG. 5 shows a schematic block diagram of a first embodiment of an access control device 10 according to the present invention, comprising a plurality of ultra-wideband transceiver(s) 12 and a processing unit 14. The processing unit 14 shall be described in detail with respect to its function in relation with the flowcharts of FIGS. 6 to 10.

According to embodiments of the present disclosure, the access control device 10 is configured to receive said authentication data from the authentication device (100), receive the evacuation signal, and/or transmit the warning signal using one or more of the plurality of ultra-wideband transceiver(s) 12.

Alternatively, or additionally, according to further embodiments of the present disclosure (shown with dotted lines on FIG. 5), the access control device 10 further comprises a communication module 16 for establishing data communication link(s) with the authentication device(s) 100 and/or the barrier(s) 5, 5.1, 5.2, 5.3, 5.4 for receiving authentication data from the authentication device(s) 100 respectively for controlling the barrier(s) 5, 5.1, 5.2, 5.3, 5.4. According to embodiments of the present disclosure, the communication module 16 comprises wireless communication interface(s) (such as Bluetooth Low Energy BLE, a Wireless Local Area Network WLAN, Zig Bee, Radio Frequency Identification RFID, Z-Wave, and/or Near Field Communication NFC interface(s)) and/or wired communication interface(s) (such as an Ethernet interface).

Figure 6:
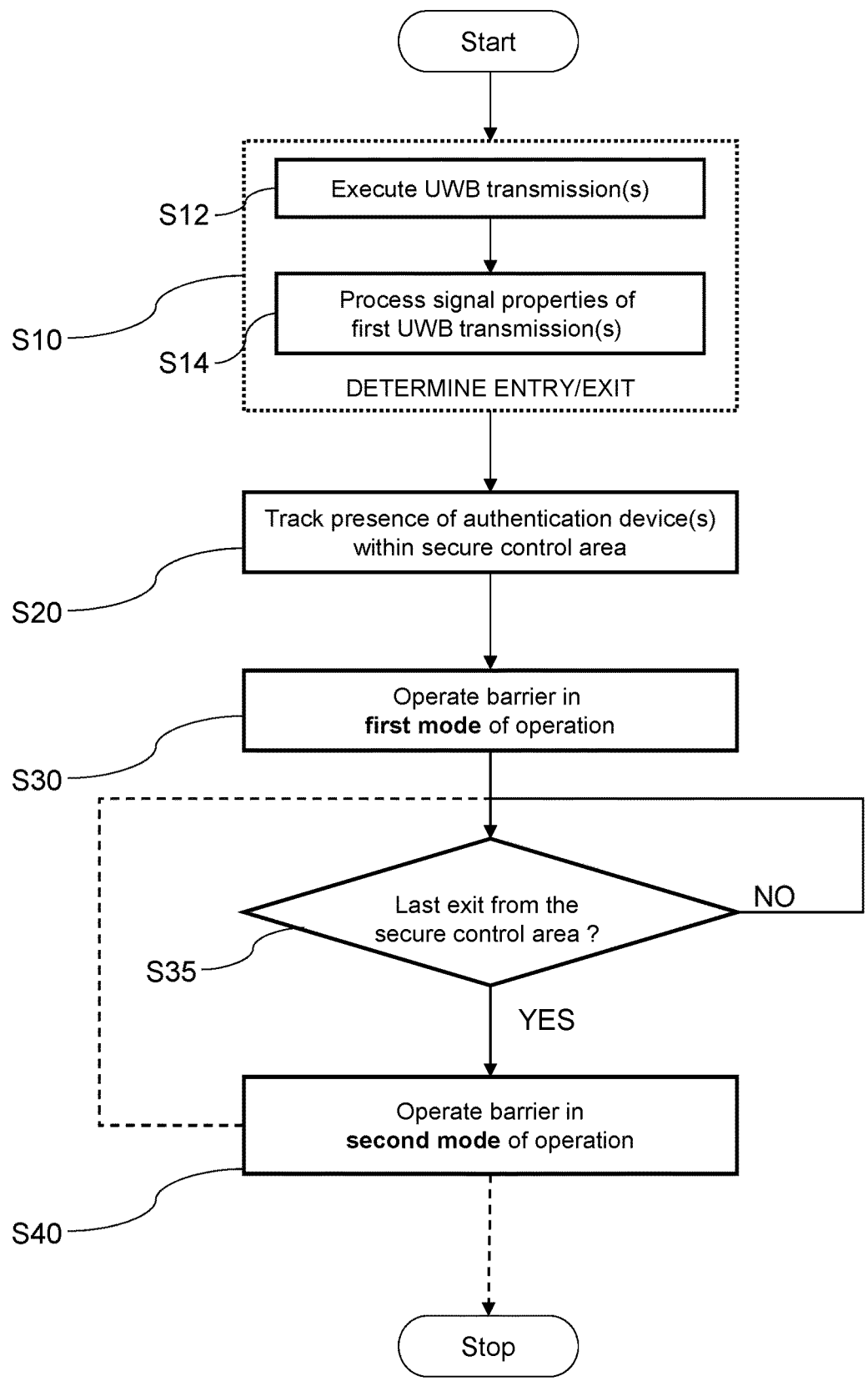
FIG. 6: shows a flow chart illustrating a sequence of steps of a first embodiment of a method for controlling access within a secure control area according to the present invention.

FIG. 6 shows a flow chart illustrating a sequence of steps of a first embodiment of a method for controlling access within a secure control area A according to the present invention. In a step S10, entry and exit movements of authentication device(s) 100 through the barrier(s) 5, 5.1, 5.2, 5.3, 5.4 are detected—by processing unit 14 of the access control device 10. In a first sub-step S12 of step S10, one or more ultra-wideband transmission(s) with one or more authentication device(s) 100 are executed using one or more ultra-wideband transceiver(s) 12 of the access control device 10.

In a second sub-step S14 of step S10, signal properties of the one or more ultra-wideband transmission(s) are processed by the processing unit 14 of the access control device 10. According to embodiments of the present disclosure, sub-step S14 comprises multilateration and/or multiangulation using the plurality of ultra-wideband transmissions, in particular by a plurality of UWB antennae of the ultra-wideband transceiver(s) 12 of the access control device 10.

In a step S20, the presence of authentication device(s) 100 within the secure control area A is tracked—by processing unit 14 of the access control device 10. In particular, in order to be able to identify the so-called first entry and last exit into, respectively out of the secure control area, an entry corresponding to authentication device(s) 100 is recorded into a presence list associated with the secure control area A upon the processing unit's 14 detection of entry of the authentication device(s) 100 through any one of the barrier(s) 5, 5.2, 5.3, 5.4. According to embodiments of the present disclosure, the presence list is maintained in a data store comprised by or commutatively connected to the access control device 10.

The entry(s) corresponding to authentication device(s) 100 is/are removed from the presence list associated with the secure control area A upon the processing unit's 14 detection of exit of the authentication device(s) 100 through any one of the barrier(s) 5, 5.1, 5.2, 5.3, 5.4.

In a step S30, the barrier(s) 5, 5.1, 5.2, 5.3, 5.4 are operated—by the access control is device in a first mode of operation. In particular, within steps S30, for increased convenience and/or flexibility, in the first mode of operation, the access control device 10 operates the barrier(s) 5, 5.1, 5.2, 5.3, 5.4 such as to allow entry or exit irrespective of an authentication of authentication device(s) 100.

In a step S35, a last exit of an authentication device 100 is determined, in particular based on the presence list, upon removing the last entry from the presence list.

In a step S40, operation of the barrier(s) 5, 5.1, 5.2, 5.3, 5.4—by the access control device 10—is switched from the first mode of operation into a second mode of operation. In particular, for maintaining security of the secure control area, in the second mode of operation, the access control device 10 operates the barrier(s) 5, 5.1, 5.2, 5.3, 5.4 such as to allow or deny entry of an authentication device(s) 100 into the secure control area A in accordance with an access control process of the authentication device(s) 100.

Figure 7:
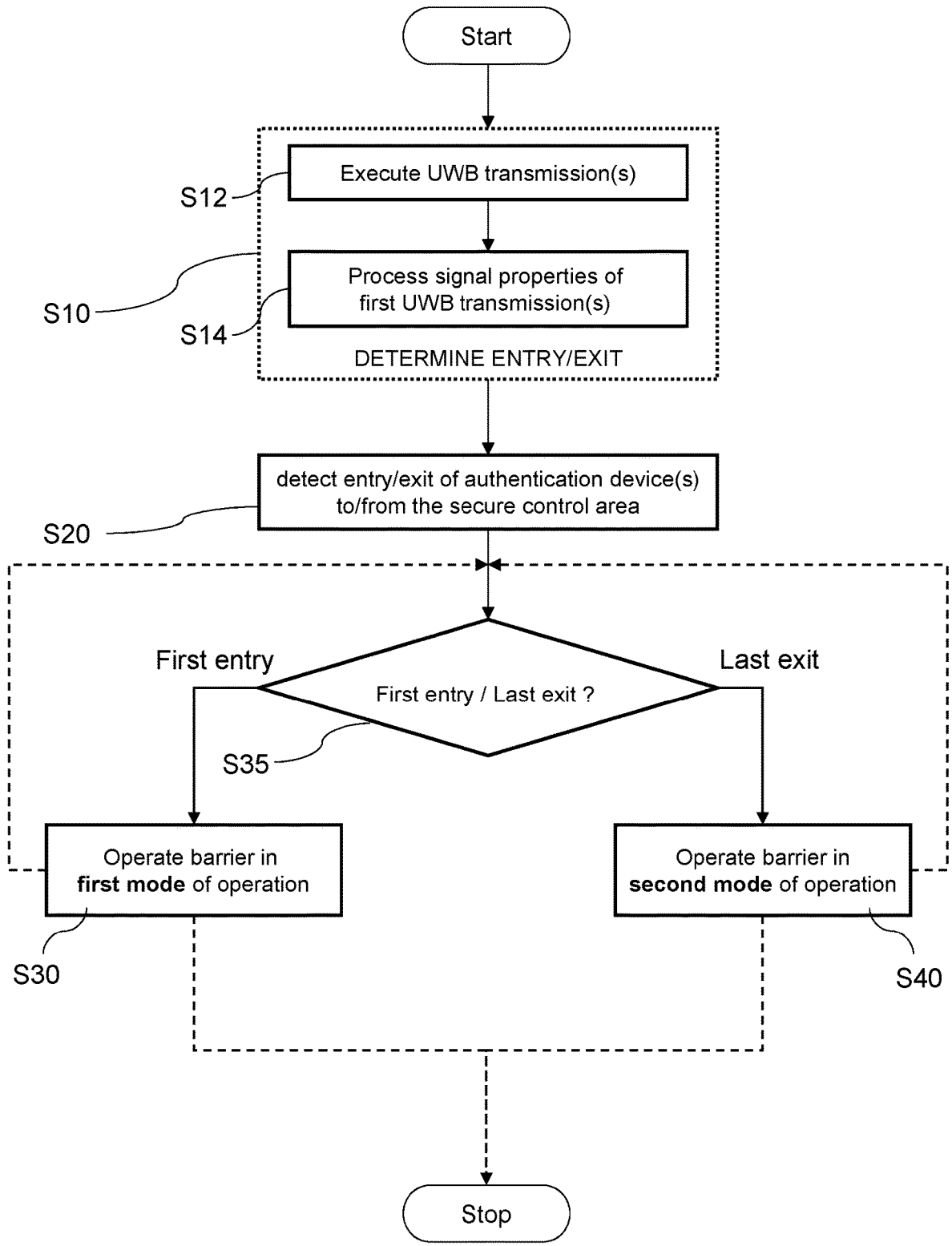
FIG. 7: shows a flow chart illustrating a sequence of steps of a further embodiment of a method for controlling access within a secure control area according to the present invention.

FIG. 7 shows a flow chart illustrating a sequence of steps of a further embodiment of a method for controlling access within a secure control area A according to the present invention, wherein operation of the barrier(s) 5, 5.1, 5.2, 5.3, 5.4—by the access control device 10—in the first mode of operation (increased convenience and/or flexibility) is triggered by determining a first entry of an authentication device(s) 100 into the secure control area A. In particular, a first entry of an authentication device 100 into the secure control area A is determined upon recording the first entry into the presence list.

Figure 8:
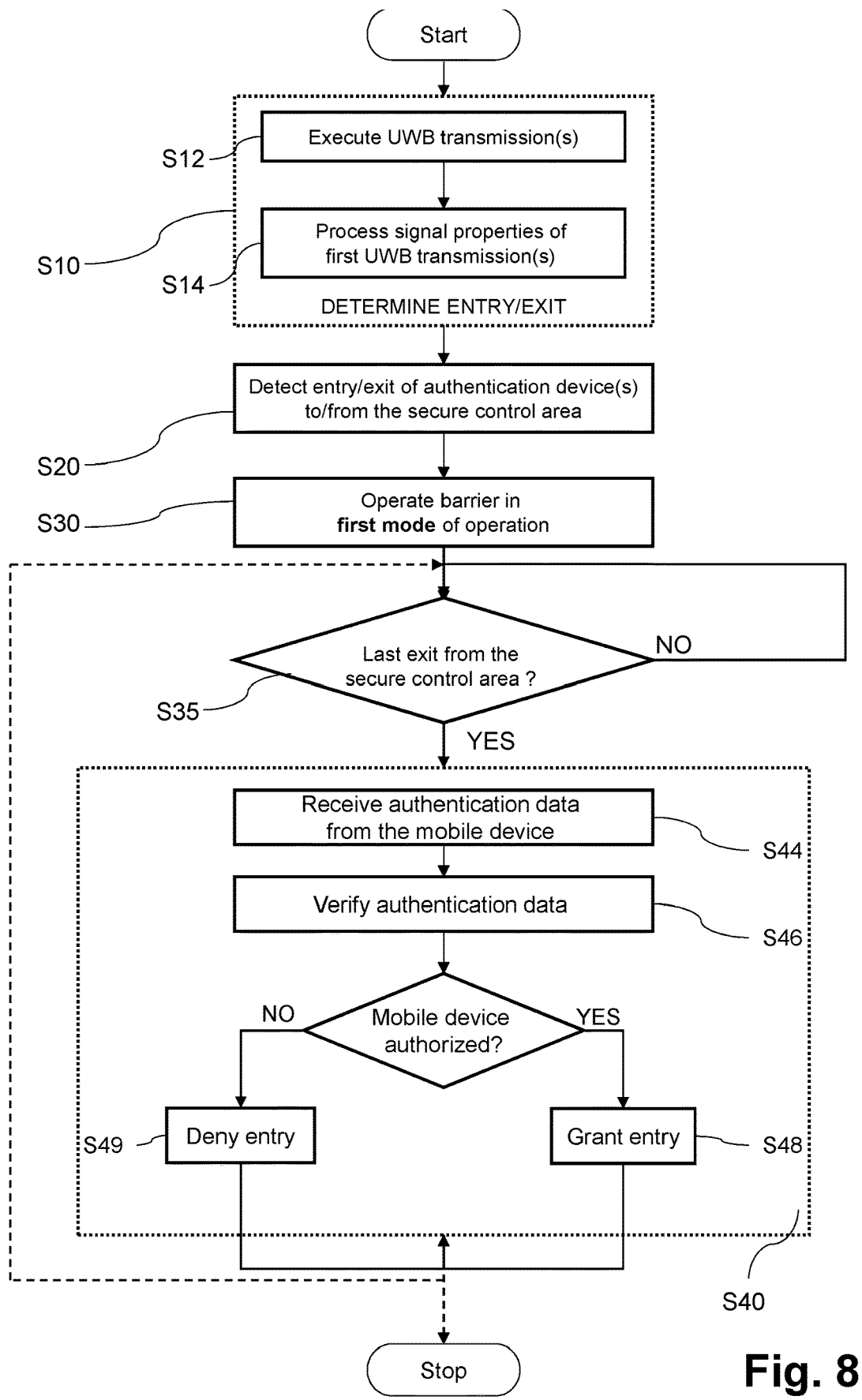
FIG. 8: shows a flow chart illustrating a sequence of steps of a further embodiment of a method for controlling access within a secure control area according to the present invention.

Turning now to FIG. 8, details of step S40, shall be described in greater detail. Within step S40, the access control device 10 executes an access control process(s) with respect to the barrier(s) 5.1, 5.2, 5.3, 5.4. The wording "execute an access control process(s) with respect to a barrier" refers to performing the access control process dedicated to the particular barrier, comprising verifying whether the authentication device(s) 100 (it's user) is authorized to pass that particular barrier 5.1, 5.2, 5.3, 5.4.

In a first substep S44 of an access control process(s), executed by the access control device 10 in the second mode of operation, authentication data is received from the authentication device 100. Having received the authentication data, in a substep S46 the authentication data is verified in order to determine whether the authentication device 100 is authorized access into the secure control area A. Such verification of the authentication data may be performed either by a comparison with authentication data stored in a data store (comprised by or communicatively connected to the access control device) and/or by verifying using a corresponding algorithm.

If, based on verifying the authentication data, it has been determined that the authentication device 100 is authorized, in a substep S48, the access control device 10 operates the barrier(s) 5, 5.1, 5.2, 5.3, 5.4 in whose proximity the authentication device 100 is located such as to allowing entry.

On the other hand, if, based on verifying the authentication data, it has been determined that the authentication device 100 not authorized, in a substep S49, the access control device 10 operates the barrier(s) 5, 5.1, 5.2, 5.3, 5.4 to deny entry.

Figure 9:
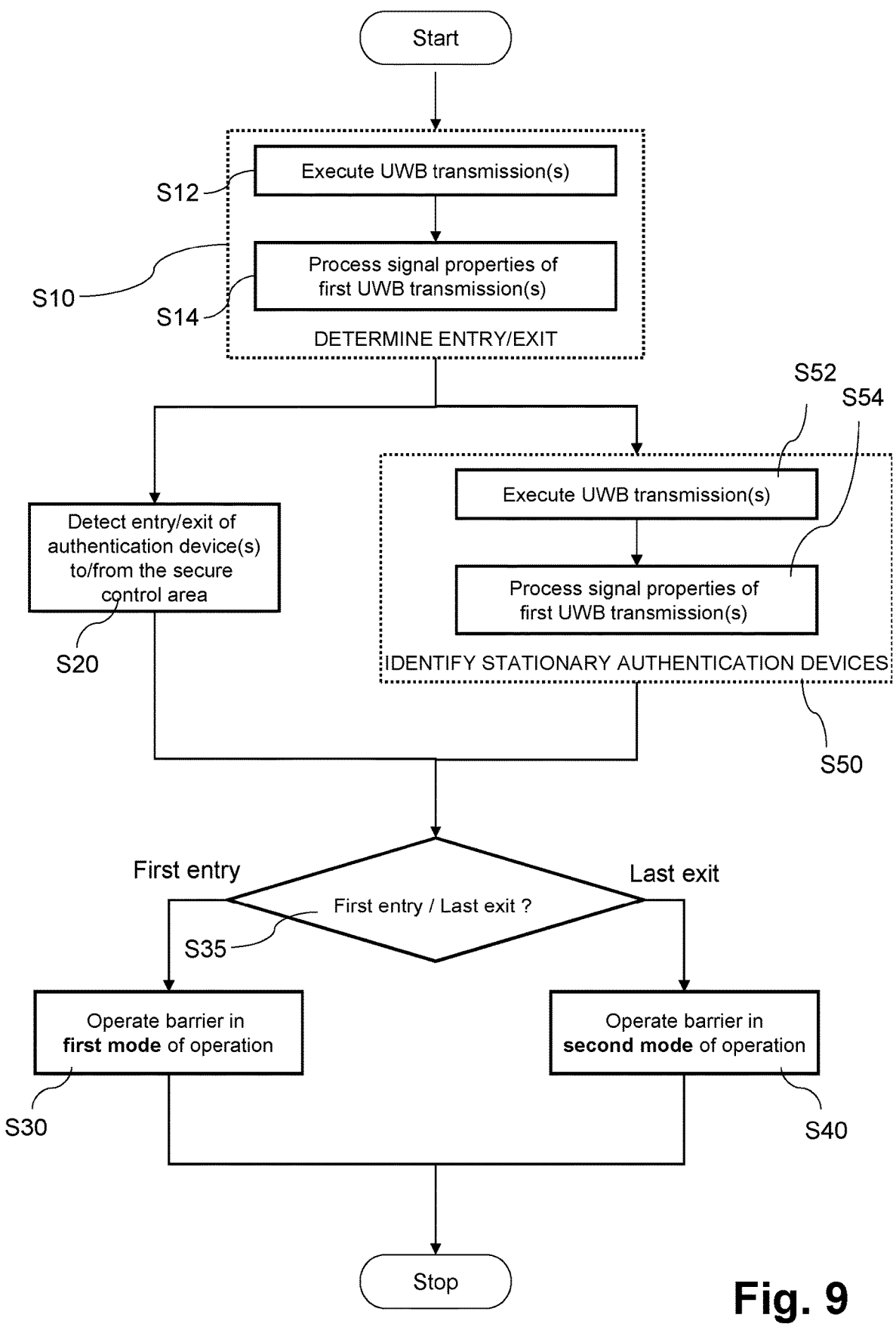
FIG. 9: shows a flow chart illustrating a sequence of steps of a further embodiment of a method for controlling access within a secure control area according to the present invention, wherein stationary authentication devices are identified.

FIG. 9 shows a flow chart illustrating a sequence of steps of a further embodiment of a method for controlling access within a secure control area A according to the present invention, wherein—in a step S50—stationary authentication devices 100 are identified.

In a substep S52, further ultra-wideband transmissions are executed—at (periodic) intervals—with authentication device(s) 100 using the ultra-wideband transceiver(s) 12 of the access control device 10. In a substep S54, signal properties of the further ultra-wideband transmissions are processed and authentication device(s) 100 which are stationary for an extended period of time are identified.

In order to prevent authentication devices 100 which has been forgotten (left behind) in the secure control area A to negatively affect security (by wrongly assuming the presence of authorized personnel), within step S35, stationary authentication device(s) 100 are disregarded when determining a last exit of an authentication device 100 from the secure control area A.

Figure 10:
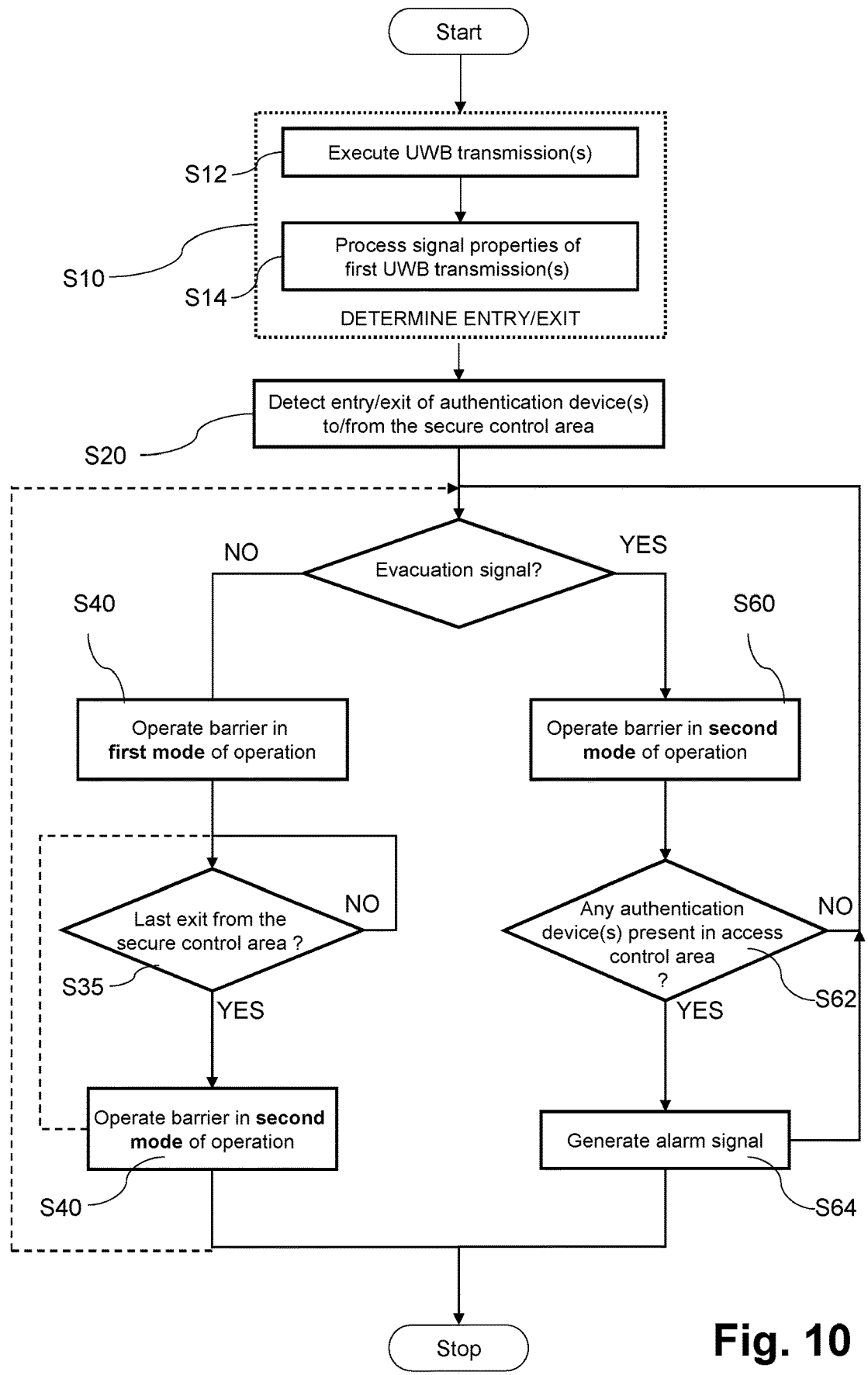
FIG. 10: shows a flow chart illustrating a sequence of steps of a further embodiment of a method for controlling access within a secure control area according to the present invention, adapted to address evacuation scenario(s).

FIG. 10 shows a flow chart illustrating a sequence of steps of a further embodiment of a method for controlling access within a secure control area A according to the present invention, adapted to address evacuation scenario(s). In order to facilitate safe evacuation from the secure control area A, in a step S60, the access control device 10 operates the barrier(s) 5, 5.1, 5.2, 5.3, 5.4 in a third mode of operation upon receipt of an evacuation signal. Operating the barrier(s) 5, 5.1, 5.2, 5.3, 5.4 in the third mode of operation comprises: allowing entry and exit through the barrier(s) 5, 5.1, 5.2, 5.3, 5.4 irrespective of an authentication of authentication devices 100.

In a step S62, it is determined whether there are still any authentication device(s) in the access controlled area A after expiry of an evacuation timeout.

In the absence of determining a last exit from the secure control area A after expiry of an evacuation timeout, in a step S64, an alarm signal is generated—by the access control device 10. In particular, the alarm signal comprises: an audible, visual or tactile signal emitted by the access control device 10 or a device communicatively connected thereto and/or a data signal comprising data indicative of said alarm. Optionally, data identifying each authentication device(s) 100 with respect to which an entry into the secure control area (A) has been detected by the barrier(s) (5, 5.1, 5.2, 5.3, 5.4) but no exit out of the secure control area (A) has been detected by any of the barrier(s) (5, 5.1, 5.2, 5.3, 5.4) is included, into the alarm signal.

LIST OF REFERENCE NUMERALS

| | |
|---|---|
| security control system | 1 |
| barrier | 5, 5.1, 5.2, 5.3, 5.4 |
| access control device | 10, 10.1, 10.3 |
| ultra-wideband transceiver | 12 |
| processing unit | 14 |
| communication module | 16 |
| authentication device | 100 |
| ultra-wideband communication module (of the authentication device) | 102 |
| secure control area | A, A' |

What is claimed is:

1. A method for controlling access within a secure control area using an access control device communicatively connected to one or more barrier(s) arranged within the secure control area, the method comprising:
executing ultra-wideband transmissions with one or more authentication devices using one or more ultra-wideband transceiver(s) of the access control device;
detecting, by a processing unit of the access control device, entry and/or exit of the one or more authentication devices through the barrier(s) by processing signal properties of the one or more ultra-wideband transmissions;
operating the barrier(s) by the access control device, in a first mode of operation, wherein in the first mode of operation, the access control device operates the barrier(s) such as to allow entry or exit irrespective of an authentication of the one or more authentication devices; and
switching operation of the barrier(s) by the access control device, from the first mode of operation into a second mode of operation upon determining a last exit of any authentication device from the secure control area, wherein in the second mode of operation, the access control device operates the barrier(s) such as to allow or deny entry of the one or more authentication devices into the secure control area in accordance with an access control process of the one or more authentication devices.

2. The method according to claim 1, wherein the access control process(s), executed by the access control device in the second mode of operation, comprises: receiving authentication data from the authentication device; verifying the authentication data in order to determine whether the authentication device is authorized access into the secure control area; allowing entry using the barrier(s) if the authentication device is authorized; and denying entry using any of the barrier(s) if the authentication device is not authorized.

3. The method according to claim 1, further comprising: executing at intervals further ultra-wideband transmissions with the one or more authentication devices using the ultra-wideband transceiver(s) of the access control device; identifying, by the processing unit of the access control device, the one or more authentication devices which are stationary for an extended period of time, by processing signal properties of the one or more ultra-wideband transmissions; and disregarding stationary authentication device(s) when determining a last exit of an authentication device from the secure control area.

4. The method according to claim 1, further comprising: distinguishing, based on authentication data of the one or more authentication devices, between a first-type and a second-type authorization of the one or more authentication devices; and disregarding authentication device(s) of a first authorization type when determining exit of a last authentication device from the secure control area.

5. The method according to claim 1, further comprising: restricting operating the barrier(s) by the access control device, in the first mode of operation to a first time window; generating an alarm signal by the access control device, in the absence of determining a last exit from the secure control area upon lapse of the first time window.

6. The method according to claim 1, further comprising operating the barrier(s), by the access control device, in a third mode of operation upon receipt of an evacuation signal, wherein operating the barrier(s) by the access control device, in the third mode of operation comprises: allowing entry and exit through the barrier(s) irrespective of an authentication of authentication devices; generating an alarm signal, by the access control device, in the absence of determining a last exit from the secure control area after expiry of an evacuation timeout.

7. The method according to claim 5, further comprising the step of including, into the alarm signal, data identifying each of the one or more authentication devices with respect to which an entry into the secure control area has been detected by the barrier(s) but no exit out of the secure control area has been detected by any of the barrier(s).

8. The method according to claim 5, further comprising: determining, by the processing unit, the physical location(s) of the one or more authentication devices within the secure control area by multilateration and/or multiangulation using the ultra-wideband transmissions; and including, into the alarm signal, data indicative of the physical location(s) of each authentication device(s) with respect to which an entry into the secure control area has been detected by the barrier(s) but no exit out of the secure control area has been detected by any of the barrier(s).

9. The method according to claim 1, further comprising switching operation of the barrier(s), by the access control device, into the first mode of operation upon determining a first entry of an authentication device(s) into the secure control area.

10. The method according to claim 1, wherein the processing of the signal properties comprises processing one or more of: a propagation time, an amplitude variation, or a phase difference of signals of the ultra-wideband transmission(s).

11. The method according to claim 1, further comprising: recording an entry corresponding to authentication device(s) into a presence list associated with the secure control area upon the processing unit's detection of entry of the authentication device(s) through any one of the barrier(s); and removing the entry(s) corresponding to authentication device(s) from the presence list associated with the secure control area upon the processing unit's detection of exit of the one or more authentication devices through any one of the barrier(s), wherein a last exit of an authentication device is determined upon removing the last entry from the presence list, and wherein a first entry of an authentication device is determined upon recording the first entry into the presence list.

12. An access control device for controlling access within a secure control area using one or more barriers arranged within the secure control area, the access control device comprising a processing unit and one or more ultra-wideband transceiver(s), wherein the access control device is configured to:
  execute ultra-wideband transmissions with authentication device(s), using the one or more ultra-wideband transceivers of the access control device;
  detect, by the processing unit of the access control device, at least one of entry or exit of the one or more authentication devices through the one or more barriers by processing signal properties of the one or more ultra-wideband transmissions;
  operate the one or more barriers, by the access control device, in a first mode of operation, wherein in the first mode of operation, the access control device operates the barrier(s) such as to allow entry or exit irrespective of an authentication of the one or more authentication devices; and
  switch operation of the one or more barriers, by the access control device, from the first mode of operation into a second mode of operation upon determining a last exit of any authentication device from the secure control area, wherein in the second mode of operation, the access control device operates the barrier(s) such as to allow or deny entry of the one or more authentication devices into the secure control area in accordance with an access control process of the one or more authentication devices.

13. The access control device according to claim 12, wherein one or more of the ultra-wideband transceiver(s) is configured for: receiving authentication data from the one or more authentication devices; and/or receiving of evacuation signal(s); and/or transmission of alarm signal(s).

14. The access control device according to claim 12, further comprising a communication module for: receiving authentication data from the one or more authentication devices; and/or receiving of evacuation signal(s); and/or transmission of alarm signal(s).

15. An access control system for controlling access within a secure control area comprising:
  one or more barrier(s) arranged within the secure control area; and
  one or more access control devices communicatively connected to the one or more barriers, wherein the one or more access control devices are configured to:
  execute ultra-wideband transmissions with authentication device(s), using one or more ultra-wideband transceiver(s) of the one or more access control devices;
  detect, by the one or more access control devices, at least one of entry or exit of the one or more authentication devices through the one or more barriers by processing signal properties of the one or more ultra-wideband transmissions;
  operate the one or more barriers, by the one or more access control devices, in a first mode of operation, wherein in the first mode of operation, the access control device operates the barrier(s) such as to allow entry or exit irrespective of an authentication of the one or more authentication devices; and
  switch operation of the one or more barriers, by the one or more access control devices, from the first mode of operation into a second mode of operation upon determining a last exit of any authentication device from the secure control area, wherein in the second mode of operation, the access control device operates the barrier(s) such as to allow or deny entry of the one or more authentication devices into the secure control area in accordance with an access control process of the one or more authentication devices.

16. A non-transitory computer program product comprising computer-executable instructions which, when executed by a processing unit of an access control device, causes the access control device to:
  execute ultra-wideband transmissions with one or more authentication devices, using one or more ultra-wideband transceivers of the access control device;
  detect, by the processing unit of the access control device, at least one of entry or exit of the one or more authentication devices through one or more barriers by processing signal properties of the one or more ultra-wideband transmissions;
  operate the one or more barriers, by the access control device, in a first mode of operation, wherein in the first mode of operation, the access control device operates the barrier(s) such as to allow entry or exit irrespective of an authentication of the one or more authentication devices; and
  switch operation of the one or more barriers, by the access control device, from the first mode of operation into a second mode of operation upon determining a last exit of any authentication device from a secure control area, wherein in the second mode of operation, the access control device operates the barrier(s) such as to allow or deny entry of the one or more authentication devices into the secure control area in accordance with an access control process of the one or more authentication devices.

* * * * *

UNITED STATES PATENT AND TRADEMARK OFFICE
CERTIFICATE OF CORRECTION

PATENT NO. : 12,230,088 B2
APPLICATION NO. : 18/256029
DATED : February 18, 2025
INVENTOR(S) : Paul Studerus et al.

It is certified that error appears in the above-identified patent and that said Letters Patent is hereby corrected as shown below:

On the Title Page

Item (57) Column 2, Line 12, delete "the barrier(s) by" and insert --the barrier(s) – by--.

In the Specification

In Column 3, Line 56, delete "s Determining the" and insert --Determining the--.

In Column 4, Line 4, delete "and the is authentication" and insert --and the authentication--.

In Column 6, Line 7, delete "area (A) is has" and insert --area (A) has--.

In Column 7, Line 59, delete "access control is device" and insert --access control device--.

In Column 7, Line 65, delete "control device may" and insert --control device 10 may--.

In Column 8, Line 16, delete "(WLAN), Zig Bee, Radio" and insert --(WLAN), ZigBee, Radio--.

In Column 8, Line 55, delete "5.2, 5.3, (illustrated" and insert --5.2, 5.3, 5.4) (illustrated--.

In Column 10, Line 60, delete "WLAN, Zig Bee, Radio" and insert --WLAN, ZigBee, Radio--.

In Column 11, Line 25, delete "barrier(s) 5, 5.2," and insert --barrier(s) 5, 5.1,5.2,--.

In Column 11, Line 35, delete "access control is device" and insert --access control device--.

Signed and Sealed this
Twenty-sixth Day of August, 2025

Coke Morgan Stewart
*Acting Director of the United States Patent and Trademark Office*